United States Patent [19]

Venable

[11] 3,925,715
[45] Dec. 9, 1975

[54] REGULATED DC TO DC CONVERTER
[75] Inventor: H. Dean Venable, Los Angeles, Calif.
[73] Assignee: Hughes Aircraft Company, Culver City, Calif.
[22] Filed: June 5, 1974
[21] Appl. No.: 476,640

[52] U.S. Cl. .............. 321/2; 321/45 R; 323/43.5 S
[51] Int. Cl.² ...................................... H02M 3/335
[58] Field of Search .................... 321/2, 12, 13, 18; 323/43.5 S

[56] References Cited
UNITED STATES PATENTS

| | | | |
|---|---|---|---|
| 2,959,726 | 11/1960 | Jensen | 321/2 |
| 3,217,239 | 11/1965 | Lunney | 323/43.5 S |
| 3,350,620 | 10/1967 | Barron | 321/2 |
| 3,694,726 | 9/1972 | Cielo et al. | 321/2 |

Primary Examiner—William M. Shoop
Attorney, Agent, or Firm—R. A. Cardenas; W. H. MacAllister

[57] ABSTRACT

A pulsewidth modulated DC to DC converter is disclosed which includes an inductor having first and second windings. A transformer having a plurality of primary windings is selectively coupled across a DC source through first and/or second inductor windings by a plurality of switching devices. The first and second inductor windings provide a low current through first and third paths in first and third transformer windings during first and third periods of a cycle. The first inductor winding provides a high current through second and fourth paths in second and fourth transformer windings during second and fourth periods of a cycle, respectively.

26 Claims, 5 Drawing Figures

REGULATED DC TO DC CONVERTER

FIELD OF THE INVENTION

This invention relates generally to a DC to DC converter for providing a regulated output signal. In particular, this invention relates to a variable, pulsewidth modulated DC to DC converter which has a very high efficiency.

DESCRIPTION OF THE PRIOR ART

Regulated DC to DC converters utilizing pulsewidth modulation and transferring energy by transformers are well known in the prior art. In a pulsewidth modulated converter, the output is determined by the width of the input pulse to the transformer. Converters have also utilized magnetic coupled multivibrators using transistors as switches for inducing a square wave alternating current in a transformer commonly known as quasi-square wave converters. One of the problems with switching circuits occurs when a first switching device is being switched off and a second switching device is switched on. Since a transistor normally turns off more slowly than it turns on there is a time overlap during which both transistors are on and therefore a high current spike on the leading and trailing edges of the current pulse may be developed. With such a current spike there is a danger of damaging the transistors in the circuit. Another problem with many prior art DC to DC converters is that the use of a diode in the high current path of the input stage induces power losses which results in an inefficient converter.

Another disadvantage of prior art DC to DC converters utilizing a single transformer with a plurality of secondary windings for different output voltages is that each output voltage required an individual inductor-capacitor filter.

Generally speaking, most converters, heretofore, have not been able to achieve a satisfactorily high efficiency which is especially necessary in applications involving a limited power source. The low efficiency of the prior art converters is most apparent in low voltage converters such as 28 volt DC to DC converters used in aircraft and space systems. For example, in a 28 volt regulated DC to DC converter having a diode in the high current path, a 1 volt drop across that diode results in a loss of efficiency of 3.6%, notwithstanding other losses. In a 100 volt DC to DC converter, that same 1 volt loss across the diode would result in efficiency reduction of only 1%. In such low voltage circuits judicious use must be made of diodes in order that such losses be prevented or at least kept at a minimum. Overall, most prior art converters have been unable to achieve efficiency in excess of 80 to 85%.

SUMMARY OF THE INVENTION

Accordingly, it is the object of the present invention to provide a simple, reliable and efficient regulated DC to DC converter.

It is another object of the present invention to provide a DC to DC converter having a pulsed input stage which does not induce high current spikes as a result of switching input currents.

It is still another object of the present invention to provide a plurality of output circuits which substantially eliminate the need of individual output inductive filters for each output circuit.

In accordance with the foregoing objects a DC to DC converter, according to the present invention, includes a transformer having a plurality of primary windings selectively coupled across a power source by a plurality of switching circuits and selected windings of an inductor having first and second windings. First and second inductor windings and a first switching circuit provide a first current path through selected primary windings for a first period of time. The first inductor winding and a second switching circuit provide a second current path through selected primary windings for a second preselected period of time. The first and second inductor windings and a third switching circuit provide a third current path through selected primary windings for a third preselected period of time. The transformer has a plurality of secondary windings respectively coupled to output circuits for providing a plurality of DC outputs.

DETAILED DESCRIPTION OF THE DRAWINGS

Figure 1:
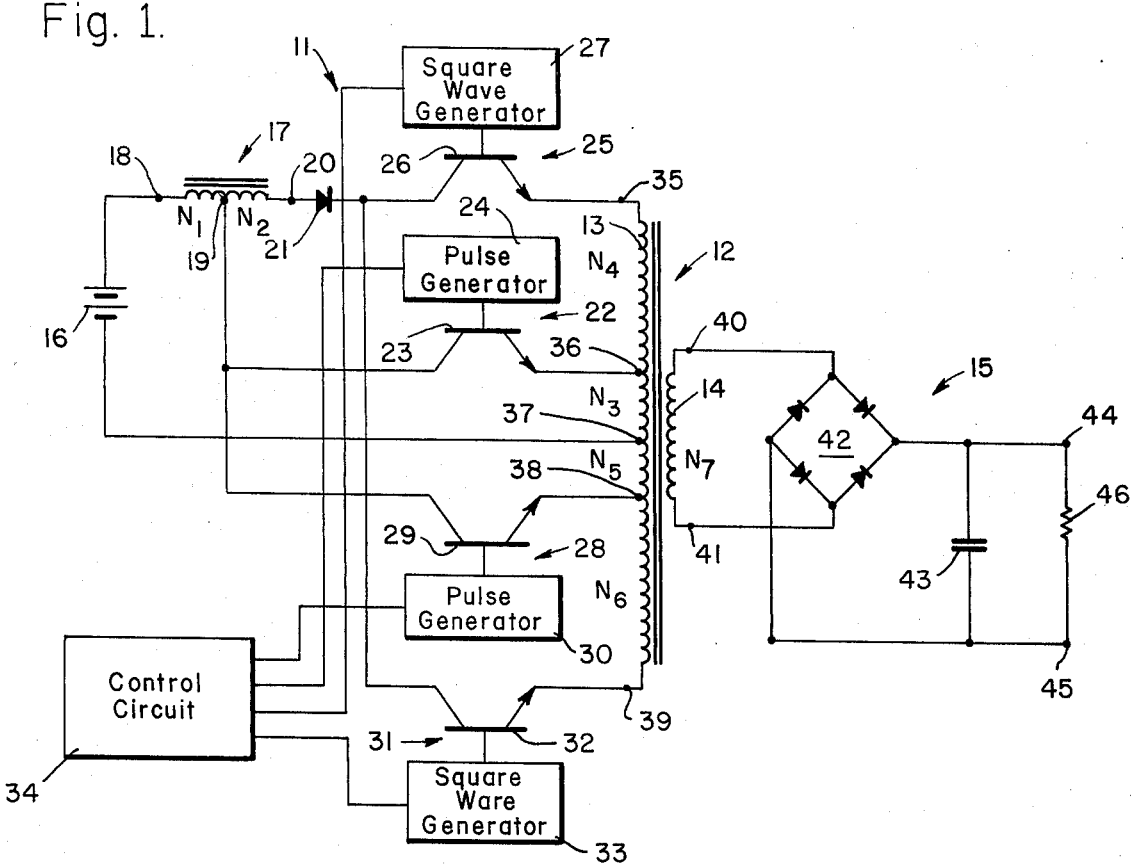
FIG. 1 is a schematic circuit diagram of a first embodiment of the present invention.

Referring more specifically to FIG. 1, a regulated DC to DC converter includes an input stage 11, a transformer 12 having primary windings 13 coupled to the input stage 11. The transformer's secondary winding 14 is coupled to an output stage 15.

The input stage 11 includes a DC power supply 16 having a voltage such as +30 VDC, for example. The positive terminal of the power supply 16 is coupled to a terminal 18 of a filter inductor 17. The filter inductor 17 has two windings with $N_1$ and $N_2$ turns, respectively. Winding $N_1$ is connected between terminals 18 and 19; winding $N_2$ is connected between terminals 19 and 20. The ratio of turns $N_1/N_2$ may be predetermined value, such as for example, 1 to 1 or some other preselected ratio. The inductor 17 provides conduction of a first amount of current through windings $N_1$ and $N_2$ and a second amount of current through winding $N_1$ alone depending on the current path that is established through the transformer primary 13. For example, a maximum of one ampere may flow through windings $N_1$ and $N_2$ during a first period of time while a maximum of 2 amperes may flow through winding $N_1$ during another predetermined period of time if the ratio $N_1/N_2$ equals 1 as will be more fully discussed below.

Terminal 19 of the inductor 17 is connected to one terminal of a switching circuit 22, which includes a switching device and a drive circuit. The switching device, shown here as an npn transistor 23 may also be other suitable switching devices such as pnp transistor FET, etc., for example. The drive circuit is shown here as a pulse generator 24 but other suitable circuits may be used. The pulse generator 24 may be any suitable generator which provides the required signals for switching a transistor or other switching device into conduction and the generator 24 is not discussed in detail since pulse generators are generally known in the prior art.

The collector electrode of the transistor 23 is connected to terminal 19 of the inductor 17; the base electrode is connected to the pulse generator 24; and the emitter electrode is connected to one end of transformer winding $N_3$ at terminal 36. The pulse generator 24 maintains the transistor 23 in conduction for a period of time which is determined primarily by the input and output voltages. While the transistor 23 is conducting a first current path is established through the inductor winding $N_1$ and winding $N_3$ of the transformer primary 13. The transistor 23 may conduct for a full first half cycle or a portion of such half cycle depending on the amount of regulation required in order to maintain the output voltage constant if the output voltage is varying or vice versa.

Terminal 20 of the inductor 17 is connected to the anode electrode of a diode 21. The cathode electrode is connected to one terminal of a second switching circuit 25 which includes a switching device and a drive circuit. The drive circuit is shown as a square wave generator 27 but any other suitable triggering means may be substituted. Square wave generators are generally known in the prior art and therefore a detailed discussion of such a circuit is omitted. The switching device is depicted as an npn transistor 26 similar to the transistor 23.

The collector electrode of the transistor 26 is connected to the cathode electrode of the diode 21; the base electrode is connected to the square wave generator 27; and the emitter electrode is connected to one end of the $N_4$ winding at terminal 35 of the transformer primary 13. The square wave generator 27 maintains the transistor 26 in conduction mode so that the transistor 26 conducts current through inductor windings $N_1$ and $N_2$ and through transformer windings $N_4$ and $N_3$ during that portion of the first half cycle that the transistor 23 is not conducting. If the transistor 26 conducts for an entire half cycle the output voltage of the converter will be at a minimum. If transistor 23 conducts for an entire first half cycle the output voltage will be at a maximum.

Terminal 19 of the inductor 17 is connected to a third switching circuit 28 which includes a drive circuit and a switching device. The drive circuit is illustrated as a pulse generator 30 which may be similar to pulse generator 24. A switching device is shown as an npn transistor 29 which may be similar to transistor 23.

The collector electrode of the transistor 29 is connected to terminal 19 of the inductor 17; the base electrode is connected to the pulse generator 30; and the emitter electrode is connected to one end of transformer winding $N_5$ at terminal 38. The pulse generator 30 maintains the transistor 29 in conduction for a period of time and current flows through the inductor winding $N_1$ and through transformer winding $N_5$. The transistor 29 may conduct for a full second half cycle or a portion thereof, depending upon the input and output voltages. Transistors 23 and 29 conduct during alternate half cycles.

The cathode electrode of the diode 21 is also coupled to a fourth switching circuit 31 which may be similar to switching circuit 25. The switching circuit 31 includes a switching device and a drive circuit. The switching device may be an npn transistor 32 that is similar to the other transistors above. The drive circuit is illustrated as a square wave generator 33 and may be similar to the square wave generator 27.

The collector electrode of the transistor 32 is connected to the cathode electrode of the diode 21; the base electrode is connected to the square wave generator 33; and the emitter electrode is connected to one end of the $N_6$ winding of the transformer primary 13 at terminal 39. The square wave generator 33 maintains the transistor 32 in conduction mode so that the transistor 32 conducts current through inductor windings $N_1$ and $N_2$ and transformer windings $N_6$ and $N_5$ during that portion of the second half cycle that transistor 29 is not conducting. If transistor 29 conducts for an entire half cycle the output voltage of the converter will be maximized, and if transistor 32 conducts for an entire half cycle, the output voltage will be minimized.

A control circuit 34 is connected to the four switching circuits 22, 25, 28 and 31 for providing the timing signals to maintain the required pulsewidth from the four switching devices and, therefore, maintaining the proper output voltage. The control circuit 34 keeps the output signals from the square wave generators 27 and 33 180° out of phase.

The transformer 12 has a primary winding 13 and one or more secondary windings 14, although only one secondary winding having $N_7$ turns is illustrated. The primary 13 has four windings with $N_3$, $N_4$, $N_5$ and $N_6$ turns. Winding $N_4$ is connected between terminals 35 and 36; $N_3$ is connected between terminals 36 and 37; $N_5$ is connected between terminals 37 and 38; and $N_6$ is connected between terminals 38 and 39. The terminal 37 of the primary winding 13 is connected to the negative terminal of the power supply 16. The turns ratio of the primary windings is preferably the same as the ratio of inductor windings $N_1/N_2$. For instance, if the inductor windings have a turns ratio $N_1/N_2$ of 1/1, then preferably the primary windings $N_3/N_4$ and $N_5/N_6$ should have the same ratio. The turns ratios are preferably the same in order that the ampere-turns of the primary be constant throughout the transition time that a first transistor is switched off and a second transistor is switched on. For purposes of illustration assume that $N_1$ equals $N_2$, $N_3$ equals $N_4$, and that the transistor 23 is conducting two amperes through inductor winding $N_1$ at the time it is turned off. As transistor 26 is turned on a second current path is made through the inductor windings $N_1$ and $N_2$ instantly resulting in doubling the turns of the inductor 17. Since the ampere-turns of the inductor must be conserved only one ampere will flow in the two windings $N_1 + N_2$. The ampere-turns of the primary is maintained constant since one ampere now flows in a primary winding that has twice as many turns, that is $N_3 + N_4$, instead of two amperes flowing in winding $N_3$. Since the ampere-turns of the two current paths through the transformer primary windings $N_3$ and $N_3 + N_4$ is the same there is no discontinuity in the current at the output of the converter as transistors 23 and 26 are switched off and on. The secondary winding 14 has $N_7$ turns between terminals 40 and 41. The number of turns of winding $N_7$ is determined by the required output voltage. There may be several secondary circuits in the transformer 12 although only one is shown for purposes of illustration.

A full wave rectifier bridge 42 is shown connected across secondary winding $N_7$ at terminals 40 and 41. The rectifier 42 is also connected to a capacitor 43 and to output terminals 44 and 45 for providing an output voltage to a load 46. The capacitor 43 is used both for filtering the output voltage, and for clamping the voltages across the various windings of the transformer 12 at predetermined values. For example, the capacitor may clamp the output voltage across terminals 44 and 45 at 30 VDC, thereby clamping the voltage across terminals 40 and 41 of the secondary 14 at 30 VDC also. As a consequence, the voltages on the primary terminals 35–39 are clamped at predetermined values depending on the relationship of the turns in the primary winding 13 to the turns in the secondary winding 14.

The operation of the first embodiment of the present invention according to FIG. 1 is now described with reference to that figure and to FIG. 2. For purposes of illustration, consider the output and input voltages are both +30 VDC, the transformer 12 is operating at 10 kilohertz and $N_1/N_2 = N_3/N_4 = N_5/N_6 = 1$.

Figure 2:
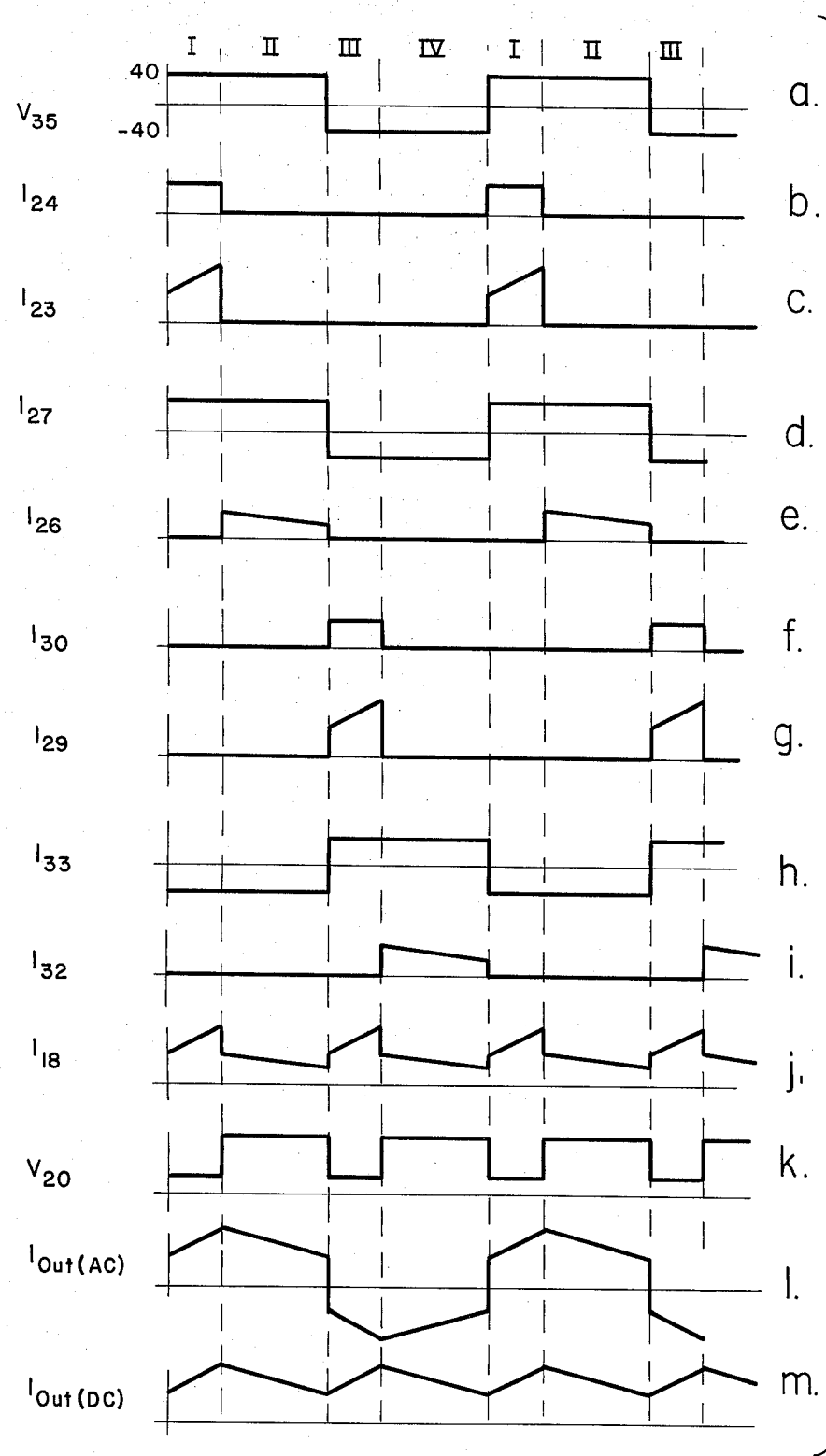
FIG. 2 is a diagram of voltage and current waveforms at various points in the circuit of the invention according to FIG. 1.

The following discussion pertains to the circuit of FIG. 1 and to the waveforms of FIG. 2 section I, which represents the operation of the circuit during a first portion of a first half cycle. The pulse generator applies a signal, FIG. 2b, to the transistor 23 causing that transistor to conduct current along a first current path from the power supply 16 through the inductor winding $N_1$ and through the transformer winding $N_3$. A current is induced in the transformer secondary winding 14 which charges capacitor 43 and clamps the output voltage at +30 VDC while the voltages at the various other terminals of the transformer primary 13 are clamped at respective values. The voltage across terminals 36 and 37 of the transformer primary winding $N_3$ is clamped at +20 VDC and the voltage across terminals 35 and 37 of the transformer primary windings $N_4 + N_3$ is clamped at +40 VDC. FIG. 2a illustrates the voltage waveform at terminal 35 of the transformer primary 13. Since there is +30 VDC at terminal 18 of the inductor 17 and +20 VDC at terminal 36 of the primary winding $N_3$, the inductor 17 provides an up-ramping current through the transistor 22 as a result of the 10-volt difference between those two terminals. The ramp current through winding $N_1$ of the inductor 17 is illustrated in FIG. 2j and the resultant current through the transistor 23 is illustrated in FIG. 2c. The pulse generator 24 maintains the transistor 22 in conduction for about 16 microseconds during which time that transistor conducts an average current of about two amperes through the primary winding $N_3$. An upramping current waveform is shown at FIG. 2L as the AC output of the transformer secondary 14. The DC output to a load 46 is shown by FIG. 2M The pulsewidth from the pulse generator 24 is not limited to 16 microseconds but may be shorter or longer depending on the output voltage desired. For a maximum output voltage the pulse generator 24 would maintain the transistor 23 in conduction for a full half cycle of 50 microseconds. If on the other hand, a minimum output voltage from terminals 44 and 45 is desired the pulse generator 24 would provide no signal to the transistor 23. Typically, the output voltage must be maintained constant while the input voltage may vary somewhat. For example, the input voltage may drop a few volts while the output voltage should be constant at +30 VDC. In order to maintain a constant output voltage the pulsewidth of the pulse generators 24 and 30 must be increased so that their respective transistors conduct for a longer time.

During the time that the transistor 23 is conducting the diode 21 is reverse biased by the +10 VDC at terminal 20 of the inductor 17 and the +40 VDC at terminal 35 of the transformer primary winding 13. With the diode 21 reverse biased the transistor 26 cannot conduct.

Referring now to FIG. 1 and FIG. 2, Section II, the operation of the invention during a second portion of the first half cycle is now discussed. As the pulse generator 24 drives the transistor 23 to cutoff, the transistor 26 conducts current through a second current path which includes inductor windings $N_1$ and $N_2$ and transformer windings $N_4$ and $N_3$, since the square wave generator 27 applies the necessary signal for turning that transistor on, FIG. 2a. The instantaneous current through the inductor windings $N_1$ and $N_2$, is reduced to one-half the value at the end of the first period since number of turns of that inductor has doubled and the ampere-turns must be conserved, as illustrated in FIG. 2d. As the transistor 26 conducts current through the windings $N_1$ and $N_2$, the voltage at terminal 20 of the inductor 17 reaches +40 VDC, FIG. 2b ignoring small voltage drops across the semiconductor junctions, and the voltage at terminal 18 is +30 VDC. The waveform of the current through the inductor 17 is a down-sloping ramp since the power supply 16 must drive current into a point at a higher voltage, and is illustrated at FIG. 2j. The waveform of the current through the transistor 26 illustrated at FIG. 2e is a down-sloping ramp also. The AC output current of the transformer secondary 14 is shown by the waveform of FIG. 2l while the DC output current of the circuit is shown by FIG. 2m.

A first current path is established through inductor winding $N_1$ and transformer winding $N_3$ during the period that transistor 23 is conducting. At the end of this first period a maximum current is flowing through the transformer winding $N_3$. A second current path is established through inductor windings $N_1$ and $N_2$ and transformer windings $N_3$ and $N_4$ during the period that transistor 26 is conducting. Initially, the current being conducted by transistor 26 is one-half the amount previously conducted by transistor 23. The ampere-turns of the transformer primary are maintained constant since half as much current flows through twice as many transformer turns during the second period as did flow during the first period and, therefore, no current discontinuity is caused at the output when one transistor turns off and a second transistor turns on.

At the end of approximately 34 microseconds the square wave generator 27 switches the transistor 26 off and the first half cycle is completed.

Referred now to FIG. 1 and FIG. 2, Section III, the operation of the invention during the third period will now be described. At the end of the first half cycle the transistor 26 is switched off and the pulse generator 30 supplies a signal, FIG. 2f, to the transistor 29 causing that transistor to conduct current through a third current path including the inductor winding $N_1$ and the transformer winding $N_5$. The dc output voltage is clamped at +30 VDC by the capacitor 43. The voltage across terminals 38 and 37 of the transformer primary winding $N_5$ is clamped at +20 VDC and the voltage across terminals 39 and 37 of the windings $N_6 + N_5$ is clamped at +40 VDC by the capacitor 43. Since there is +30 VDC at terminal 18 of the inductor 17 and +20 VDC at terminal 38 of the primary winding $N_3$, the inductor 17 provides an up-ramping current through the transistor 29 as a result of the 10-volt difference between those two terminals. The ramp current through winding $N_5$ of the inductor 17 is illustrated in FIG. 2j and the resultant current through the 29 is illustrated in FIG.2g. The pulse generator 30 maintains the transistor 29 in conduction for about 16 microseconds. The 5AC output current of the transformer secondary 14 is illustrated at FIG. 2(l)while the DC output current at terminals 44 and 45 is illustrated by FIG. 2m. For a maximum output voltage during the second half cycle the pulse generator 30 would maintain the transistor 29 in conduction for the full half cycle of 50 microseconds. If on the other hand a minimum output voltage is desired, then the pulse generator 30 would provide no signal to the transistor 29 resulting in transistor 32 being in conduction during a full half cycle.

While transistor 29 is conducting in a third current path, the instantaneous current through this third, current path at the beginning of the third period is twice the value of the instantaneous current at the end of the second period. Since twice as much current flows in one half as many transformer turns during the third period as during the second period, the ampere-turns of the transformer are maintained constant throughout the time that one transistor is switched off and another transistor is switched on. The ampere-turns of the inductor 17 is also constant during the transition.

During the time the transistor 29 is conducting, the diode 21 is reverse biased by the +10 VDC at terminal 20 of the inductor 17 and the +40 VDC at terminal 39 of the transformer primary winding 13. With the diode 21 reverse biased the transistor 32 cannot conduct.

Referring now to FIG. 1 and FIG. 2, Section IV, the operation of the invention during a fourth period, which is a second portion of the second half cycle, is discussed. As the pulse generator 30 drives the transistor 29 to cutoff, the transistor 32 conducts current through a fourth current path which includes inductor windings $N_1$ and $N_2$ and transformer windings $N_6$ and $N_5$, since the square wave generator 33 has been applying the necessary signal for turning that transistor on as shown by FIG. 2h. The instantaneous current through the inductor 17, windings $N_1$ and $N_2$, at the beginning of the fourth period is reduced to one-half the instantaneous value at the end of the third period since the inductor turns have doubled and the ampere-turns must be conserved; see FIG. 2j. As the transistor 32 conducts current through the windings $N_1$ and $N_2$, the voltage at terminal 20 of the inductor 17 is +40 VDC, ignoring small voltage drops across the semiconductor junctions, and the voltage at terminal 18 is +30 VDC. The waveform of the current through the inductor 17 is a down-sloping ramp since the power supply 16 must drive current into a point at a higher voltage. The waveform of the current through the transistor 32 is illustrated at FIG. 2i and is a down-sloping ramp also. The AC output current of the transformer is shown by the waveform of FIG. 2l while the DC output current is shown at FIG. 2m.

As pointed out above the ampere-turns of the transformer are maintained constant during the switching of one transistor off and the switching of another transistor on since half as much instantaneous current flows during the fourth period through twice as many transformer turns as did flow at the end of the third period. Therefore, there is no current discontinuity at the output caused by the transistors switching.

At the end of approximately 34 microseconds the square wave generator 33 switches the transistor 32 off ending the first full cycle. The pulse generator 24 then turns the transistor 23 on and the cycle again commences.

The control circuit 34 provides the necessary timing signals to the pulse generators 24 and 30 and to the square wave generators 27 and 33 which in turn provide the necessary signals for turning their respective transistors on and off. The pulsewidths generated by the pulse generators 24 and 30 determine the output voltage of the circuit. The greater the pulsewidth of the pulse generators the longer the transistors 23 and 29 are maintained in conduction and, therefore, the higher the output voltage. Conversely, the narrower the pulsewidth the lower the output voltage. The sequence above-described wherein transistors 23, 26, 29 and 32 conduct in that respective order is not necessarily the only sequence that may be used for practicing the invention. Transistors 26, 23, 32 and 29 may conduct in that respective order, for example. The operating frequency of the transformer 12 is not limited to 10,000 hz but other frequencies are suitable. It is pointed out that ratios of currents through the first and second current paths and the third and fourth current paths are governed primarily by the turns ratio of the first and second inductor windings. For example, the current through the second current path equals $$\frac{N_1}{N_1+N_2}$$

times the current through the first current path.

A DC to DC converter according to the circuit of FIG. 1 having a 28 VDC input and a 28 VDC output has been built and tested and was found to have an efficiency in excess of 93%. Prior art converters have efficiencies of only 80 to 85%. This increased efficiency may be attributed, in part, to absence of a diode in the high current path and therefore no diode losses are induced.

A second embodiment of the present invention is now discussed with reference to FIG. 3. Components in the circuit of FIG. 3 that are the same as the components in the circuit of FIG. 1 have the same basic reference designators and are prefixed by the numeral "1".

Figure 3:
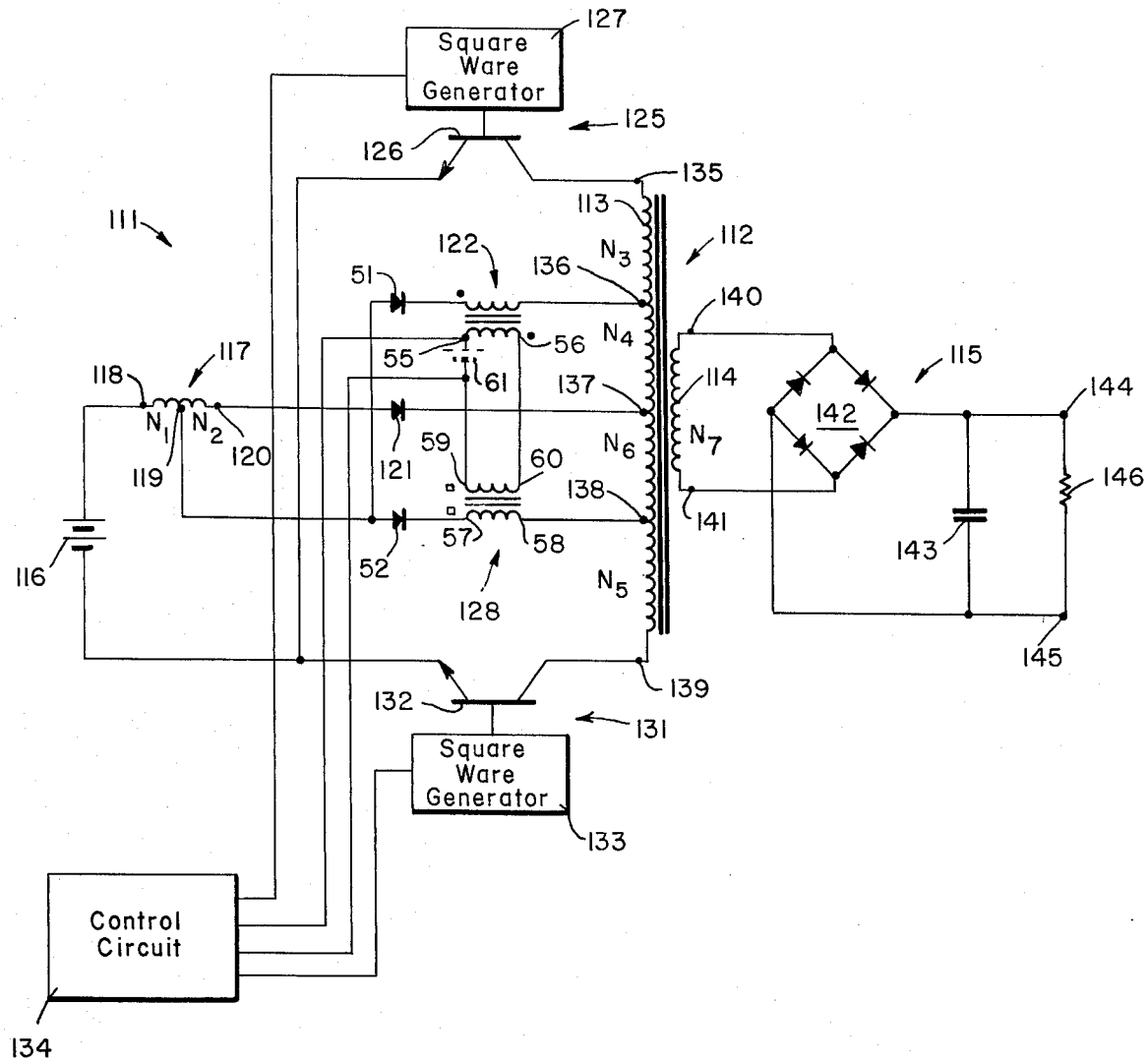
FIG. 3 is a schematic circuit diagram of another embodiment of the present invention.

The DC to DC converter according to FIG. 3 includes an input stage 111, a transformer 112 having primary windings 113 coupled to the input stage 111 and a secondary winding 114 coupled to an output stage 115. The input stage 111 includes a DC power supply 116, the positive terminal of which is coupled to terminal 118 of a filter inductor 117. The filter inductor 117 has two windings with $N_1$ and $N_2$ turns respectively. The ratio $N_1/N_2$ may be the same as discussed above in FIG. 1. Terminal 119 of the inductor 117 is connected to the anode terminals of diodes 51 and 52. The cathode electrode of the diode 51 is connected to an input terminal 53 of the switching circuit 122 and the output terminal 54 is connected to a terminal 136 of the transformer primary 113. The switching circuit 122 is illustrated here as a magnetic amplifier.

The cathode electrode of the diode 52 is connected to an input terminal 57 of the switching circuit 128 and the output terminal 58 is connected to a terminal 138 of the transformer primary 113. The control terminals 56 and 60 of the magnetic amplifier 122 and 128, respectively, are connected together. The control terminals 55 and 59 of the magnetic amplifiers 122 and 128 are connected to a control voltage 61 which is applied by the control circuit 134. The control voltage 61 determines the blocking times of the magnetic amplifiers 122 and 128. The higher the control voltage 61, the longer the magnetic amplifiers block conduction along their respective current paths and the lower the output voltage from the converter.

Terminal 120 of the inductor 117 is connected to the anode of a diode 121. The cathode electrode of the diode is coupled to a terminal 137 of the transformer primary 113. The negative terminal of the power supply 116 is connected to the output terminals from the switching circuits 125 and 131. The switching circuit 125 includes an npn transistor 126 and a square wave generator 127. The emitter electrode of the transistor 126 is connected to the negative terminal of the power supply 116; the base electrode is connected to the square wave generator 127; and the collector electrode is connected to a terminal 135 of the transformer primary 113. The switching circuit 131 includes an npn transistor 132 and a square wave generator 133. The emitter electrode of the transistor 132 is connected to the negative terminal of the power supply 116; the base electrode is connected to the square wave generator 133; and the collector electrode is connected to terminal 139 of the transformer primary 113.

The control circuit 134 is connected to switching circuits 122, 125, 128 and 131, respectively, for providing the necessary timing signals and coordinating the time that the various current paths are conducting.

The transformer 112 has four primary windings with $N_3$, $N_4$, $N_5$ and $N_6$ turns. The turns ratio of the primary windings is preferably the same as the ratio of inductor windings $N_1N_2$ as discussed above under FIG. 1.

A full wave rectifier bridge 142 is connected across the secondary winding $N_7$ at terminals 140 and 141. The rectifier 142 is also connected to a capacitor 143 and to output terminals 144 and 145 which are connected to a load 146.

The operation of the second embodiment of the present invention according to FIG. 3 is now described with reference to that figure and to FIG. 4. For purposes of discussion, consider the output and input voltages are both +30 VDC, the transformer 112 is operating at 10 khz and $N_1/N_2 = N_3/N_4 = N_5/N_6 = 1$.

Figure 4:
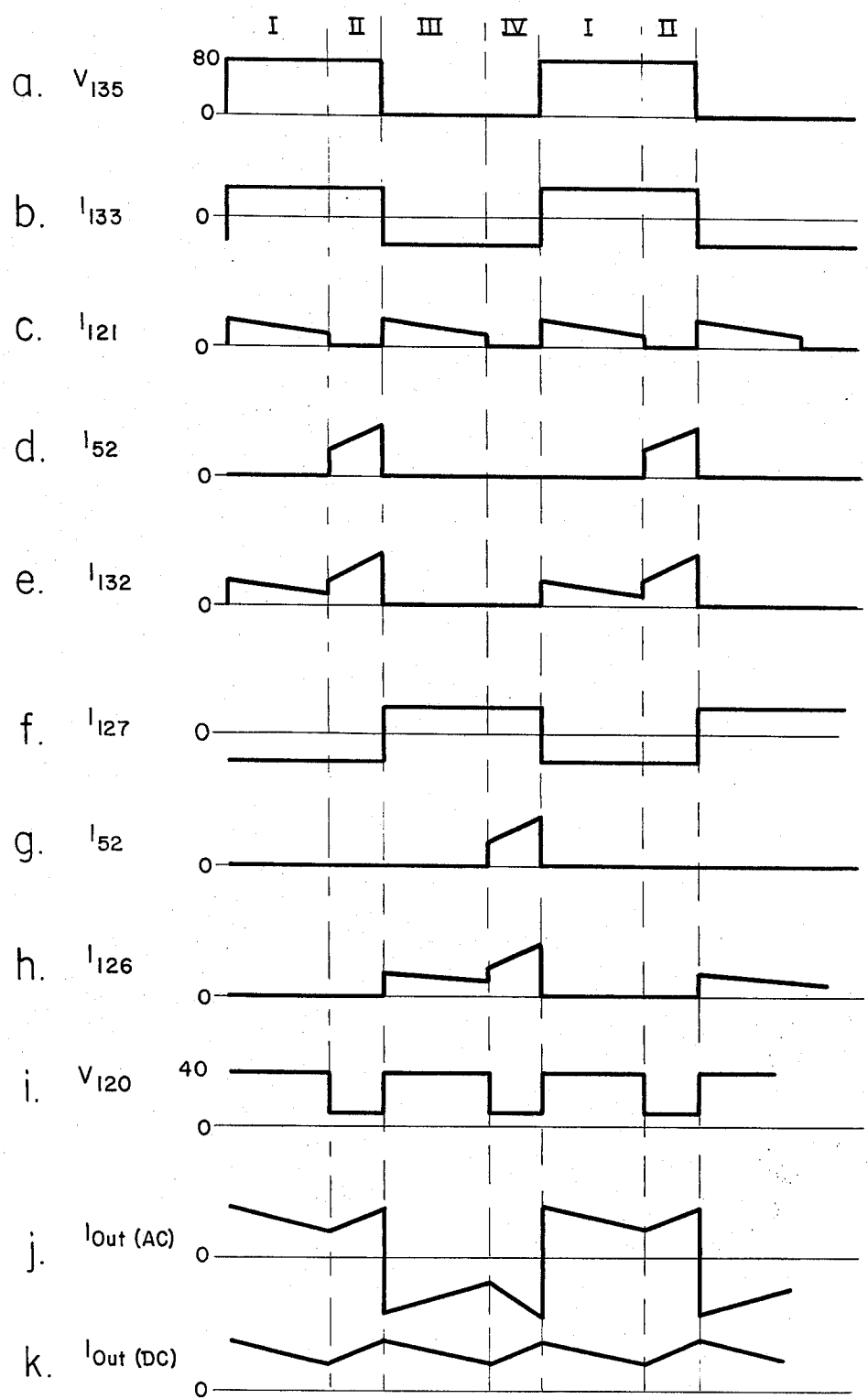
FIG. 4 is a diagram of voltage and current waveforms at various points in the circuit of the invention according to the embodiment of FIG. 3.

During the period I operation of the converter the square wave generator 133 applies a signal, FIG. 4b, to the transistor 132 causing that transistor to conduct current from the power supply 116 through the inductor windings $N_1$ and $N_2$ and through the transformer windings $N_6$ and $N_5$, respectively. The current flowing through the transformer primary windings charges the output filter capacitor 143 which in turn clamps the voltages of the primary and secondary wndings of the transformer 112 at predetermined levels; the voltage at terminal 135 of the transformer primary 113 is shown in FIG. 4a. The voltage at terminal 135 is +80 VDC; the voltage at terminal 136 is +60 VDC; and the voltage at terminal 137 is +40 VDC. The voltage at terminal 138 is +20 VDC and voltage at terminal 139 is 0 volts. Since there are +30 VDC at terminal 118 of the inductor 117 and +40 VDC at terminal 137, the waveform of the current flowing through the inductor 117 and the diode 121 is shown as a down-sloping ramp in FIG. 4c. The small control voltage 61 which is continuously applied to the magnetic amplifier terminals 55 and 59 causes the magnetic amplifier 128 to block current flow through terminals 57 and 58. As the primary winding of the magnetic amplifier 128 saturates the amplifier 128 conducts current through a second current path and the current flow through the first current path is immediately terminated. Current flowing through the transistor 132 is illustrated by the waveform of FIG. 4e. FIG. 4i demonstrates the voltage at terminal 120 of the inductor 117. The AC output current of the transformer secondary 114 is shown at FIG. 4j while the DC output current is shown at FIG. 4 k.

The operation of the invention according to FIGS. 3 and 4 will now be described with respect to period II. As the magnetic amplifier 128 conducts through a second current path, current flows through the $N_1$ winding of the inductor 117 instead of the windings $N_1$ and $N_2$ as during the period I. Since the ampere-turns of the inductor are conserved, twice as much current will now flow through the $N_1$ winding as flowed through the $N_1$ + $N_2$ windings. The second current path includes the first inductor winding and the transformer primary winding $N_5$. The current flow in the inductor winding $N_1$ and in the diode 52 is illustrated by FIG. 4 d. The current through the transistor 132 is illustrated by FIG. 4e. Since the voltage at terminal 118 of the inductor 117 is +30 VDC and the voltage at terminal 138 of the transformer primary is +20 VDC the current waveform of the current through the second current path is an up-sloping ramp. At the end of approximately 50 microseconds the signal from the square wave generator 133 places the transistor 132 at cut off and the square wave generator 127 causes the transistor 126 to conduct.

The operation of the invention according to FIGS. 3 and 4 during periods III and IV is the same as during the first two periods and will therefore not be discussed.

Figure 5:
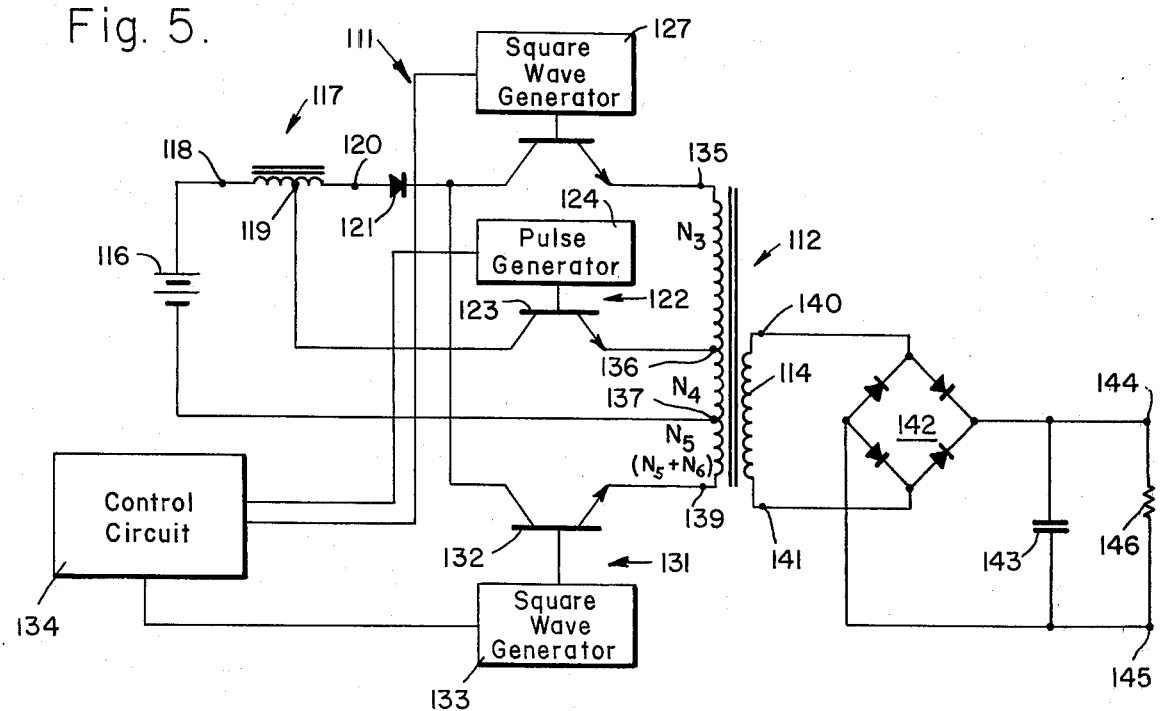
FIG. 5 is a schematic circuit diagram of other embodiments of the present invention.

Referring now to FIG. 5, third and fourth embodiments of the present invention are discussed with regard to that figure. The circuit of FIG. 5 is essentially the same as the circuit of FIG. 1 with the exception that the switching circuit 28 has been deleted from the circuit of FIG. 5. A third embodiment, according to FIG. 5, includes a transformer having four primary windings: $N_3$, $N_4$, $N_5$ and $N_6$. Winding $N_3$ is connected between terminals 135 and 136, winding $N_4$ is connected between terminals 136 and 137, and windings $N_5$ and $N_6$ are serially connected between terminals 137 and 139.

The fourth embodiment, according to the present invention, includes a transformer having a primary with three windings: $N_3$, $N_4$ and $N_5$. Winding $N_3$ is connected between terminals 135 and 136; winding $N_4$ is connected between terminals 136 and 137, and winding $N_5$ is connected between terminals 137 and 139.

The operation of the third and fourth embodiments according to FIG. 5 are similar to the operation of the circuit according to FIg. 1 and will not be discussed in detail. It is noted that the only control for varying the output voltage occurs during the first half cycle by varying the pulse width of the pulse generator 124 and for that reason the control range is reduced.

It should be apparent from the foregoing that the present invention provides a simple, reliable and highly efficient DC to DC converter for providing a regulated output. Moreover, several embodiments of the present invention have been built and found to have an efficiency in excess of 93% with input and output voltages of +28 VDC.

Although the present invention has been shown and described with reference to particular embodiments, nevertheless, various changes, modifications obvious to one skilled in the art to which the invention pertains are deemed to lie within the purview of the invention.

What is claimed is:

1. A high efficiency, variable, pulsewidth modulated DC to DC converter, comprising:
   input means;
   an inductor having first and second windings, said inductor being coupled to said input means;
   a transformer having a primary and a secondary, said primary having a plurality of windings provided first, second and third current paths;
   first switch means coupled to said first winding of said inductor for conducting current through said inductor and said first current path during a first period of a cycle in response to a first signal;
   second switch means coupled to said second winding of of said inductor for conducting current through said inductor and said second current path during a second period of a cycle in response to a second signal;
   third switch means coupled to said second winding of said inductor for conducting current through said inductor and said third current path during a third period of a cycle in response to a third signal;
   rectifier means coupled to said secondary;
   means coupled to said first, second and third switch means for providing said first, second and third signals; and
   output means coupled to said rectifier means.

2. The invention according to claim 1 further comprising:
   said transformer having a fourth current path; and
   fourth switch means coupled to said first winding of said inductor for conducting current through a fourth current path in response to a fourth signal.

3. The invention according to claim 2 wherein said first and second inductor windings comprise:
   $N_1$ and $N_2$ turns, respectively and $N_1/N_2$ is a preselected ratio.

4. The invention according to claim 3 wherein said transformer comprises:
   a first winding having $N_3$ turns;
   a second winding having $N_4$ turns;
   a third winding having $N_3 + N_4$ turns, and
   the ratio of $N_3/N_4$ is said preselected ratio.

5. The invention according to claim 3 wherein said transformer comprises:
   a first winding having $N_3$ turns;
   a second winding having $N_4$ turns;
   a third winding Having $N_5 + N_6$ turns, and
   a ratio of turns $N_3/N_4$ and $N_5/N_6$ is said preselected ratio.

6. A high efficiency variable DC to DC converter, comprising:
   input means for receiving DC power;
   an inductor having first and second windings, said first winding being coupled to said input means, said first winding for conducting a first current during first and third periods of a cycle, said first and second winding for conducting a second current during second and fourth periods, said inductor coupled to said input means;
   a transformer having a plurality of primary windings, a first winding for providing a first current path during said first period, a second winding for providing a second current path during said second period, a third winding for providing a third current path during said third period, and a fourth winding for providing a fourth current path during said fourth period, said transformer having a secondary winding, said current paths coupled to said input means;
   first switching means coupled between said first inductor winding and said first current path for providing a first current during said first period;
   second switching means coupled between said second inductor winding and said second current path for providing a second current during said second period;
   third switching means coupled between said first inductor winding and said third current path for providing a first current during said third period;
   fourth switching means coupled between said second inductor winding and said fourth current path for providing a second current during said fourth period;
   control means coupled to said first, second, third and fourth switching means for controlling said first, second third and fourth periods of said switching means;
   rectifier means coupled to said secondary winding; and
   output means coupled to said rectifier means.

7. The invention according to claim 6 wherein said first and second inductor windings comprise:
   $N_1$ and $N_2$ turns respectively, and $N_1/N_2$ is a preselected ratio.

8. The invention according to claim 6 wherein said transformer primary comprises:
   said first winding having $N_3$ turns;
   said second winding having $N_4$ turns;
   said third winding having $N_5$ turns;
   said fourth winding having $N_6$ turns; and
   the ratio of turns $N_3/N_4$ and $N_5/N_6$ is a preselected value.

9. The invention according to claim 8 wherein said inductor comprises:
   said first winding having $N_1$ turns;
   said second winding having $N_2$ turns;
   the ratio of turns $N_1/N_2$ is said preselected value.

10. The invention according to claim 9 further comprising:
    said first and second switch means for conducting current during a first half cycle; and
    said third and fourth switch means for conducting current during a second half cycle.

11. The invention according to claim 10 further comprising:
    said second current being $$\frac{N_1}{N_1+N_2}$$

of said first current.

12. The invention according to claim 11 further comprising:
    said second switching means being a first square wave generator coupled to a first current switching device; and
    said fourth switching means being a second square wave generator coupled to a second current switching device.

13. The invention according to claim 12 further comprising:
    said first switching means being a first magnetic amplifier;

said third switching means being a second magnetic amplifier coupled to said first mangetic amplifier;

control means coupled to said first and second magnetic amplifiers;

said first magnetic amplifier for conducting current during a portion of a first half cycle of said first square wave generator; and said second magnetic amplifier conducting current during a portion of a first half cycle of said second square wave generator.

14. A high efficiency DC to DC converter, comprising:

input means for receiving DC power;

an inductor having first and second windings, said first winding for conducting a first current, said first and second windings for conducting a second current, said inductor being coupled to said input means;

a diode having first and second electrodes, said first electrode being coupled to said second inductor winding;

first and second square wave generators;

first and second pulse generators;

a transformer having first, second, third and fourth primary windings, said first winding for providing a first current path, said first and second windings for providing a second current path, said third winding for providing a third path, said third and fourth windings for providing a fourth current path, said transformer having a secondary winding;

a first transistor having first, second and third electrodes, said first electrode of said transistor being coupled to said second electrode of said diode, said second electrode of said transistor being coupled to said first square wave generator, said generator for controlling said transistor, said third electrode of said transistor being coupled to said primary winding for conducting said second current through said second current path;

a second transistor having first, second and third electrodes, said first electrode of said transistor being coupled to said first inductor winding, said second electrode of said transistor being coupled to said first pulse generator, said generator for controlling said transistor, said third electrode of said transistor being coupled to said primary winding for conducting a first current through said first current path for a second predetermined period of time;

a third transistor having first, second and third electrodes, said first electrode of said transistor being coupled to said first inductor winding, said second electrode of said transistor being coupled to said second pulse generator, said generator for controlling said transistor, said third electrode of said transistor being coupled to said primary winding for conducting a first current through said third current path for a third predetermined period of time;

a fourth transistor having first, second and third electrodes, said first electrode of said transistor being coupled to said second electrode of said diode, said second electrode of said transistor being coupled to said second square wave generator, said generator for controlling said transistor, said third electrode being coupled to said primary winding, said transistor for conducting a second current through said fourth current path for a fourth predetermined period of time;

control means coupled to said first, and second square wave generators and to said first and second pulse generators for controlling the pulsewidth of said first and second pulse generators and for controlling the output of said converter and for maintaining the output of said first and second square wave generators at a predetermined phase relationship;

rectifier means coupled to said secondary winding; and output means coupled to said rectifier means.

15. The invention according to claim 14 wherein said first and second inductor windings comprise:

$N_1$ and $N_2$ turns respectively, and $N_1/N_2$ is a preselected ratio.

16. The invention according to claim 14 wherein said transformer primary comprises:

said first winding having $N_3$ turns;

said second winding having $N_4$ turns;

said third winding having $N_5$ turns;

said fourth winding having $N_6$ turns; and the ratio of turns $N_3/N_4$ and $N_5/N_6$ is a preselected value.

17. The invention according to claim 16 wherein said inductor comprises:

said first winding having $N_1$ turns;

said second winding having $N_2$ turns;

the ratio of turns $N_1/N_2$ is said preselected value.

18. The invention according to claim 17 further comprising:

said first and second transistors for conducting current during a first half cycle; and said third and fourth transistors for conducting current during a second half cycle.

19. The invention according to claim 18 further comprising:

said second current being $$\frac{N_1}{N_1+N_2}$$

of said first current.

20. A high efficiency regulated DC to DC converter, comprising:

input means for receiving DC power;

an inductor having a first winding, connected between first and second inductor terminals, and a second winding, connected between second and third inductor terminals, said first inductor terminal being coupled to said input means;

a diode having first and second electrodes said first electrode being coupled to said third inductor terminal;

first and second square wave generators;

first and second pulse generators;

a transformer having first, second, third and fourth primary windings, said first winding being coupled between first and second terminals, said second winding being coupled between first and third terminals, said third winding being coupled between second and fourth terminals, said fourth winding being coupled between fourth and fifth terminals, said second terminal being coupled to said input means, said transformer having a secondary winding;

a first transistor having first, second and third electrodes, said first electrode being coupled to said second electrodes, said first electrode being coupled to said second electrode of said diode, said second electrode of said transistor being coupled to said first square wave generator; said generator for controlling said transistor, said third electrode of said transistor being coupled to said third transformer terminal, said transistor for conducting current through first and second transformer windings during a first predetermined period of time;

a second transistor having first, second and third electrodes, said first electrode of said transistor being coupled to said second terminal of said inductor, said second electrode of said transistor being coupled to said first pulse generator, said generator for controlling said transistor, said third electrode of said transistor being coupled to said first transformer terminal, said transistor for conducting current through said first transformer winding for a second predetermined period of time;

a third transistor having first, second and third electrodes, said first electrode of said transistor being coupled to said second terminal of said inductor, said second electrode of said transistor being coupled to said second pulse generator, said generator for controlling said transistor, said third electrode of said transistor being connected to said fourth transformer terminal, said third transistor for conducting current through said third winding for a third predetermined period of time;

a fourth transistor having first, second and third electrodes, said first electrode of said transistor being coupled to said second electrode of said diode, said second electrode of said transistor being coupled to said second square wave generator, said generator for controlling said transistor, said third electrode of said transistor being coupled to said fifth transformer terminal, said transistor for conducting current through said third and fourth windings for a fourth predetermined period of time;

control means coupled to said first and second square wave generators, and to said first and second pulse generators for controlling the pulsewidth of said first and second pulse generators for controlling the output and for maintaining the output of said first and second square wave generators at a predetermined phase difference;

rectifier means coupled to said secondary winging; and output means coupled to said rectifier means.

21. The invention according to claim 20 wherein said first and second inductor windings comprise:
$N_1$ and $N_2$ turns, respectively, and the $N_1/N_2$ is a preselected ratio.

22. The invention according to claim 20 wherein said transformer primary comprises:
said first winding having $N_3$ turns;
said second winding having $N_4$ turns;
said third winding having $N_5$ turns;
said fourth winding having $N_6$ turns; and
the ratio of turns $N_3/N_4$ and $N_5/N_6$ is a preselected value.

23. The invention according to claim 22 wherein said inductor comprises:
said first winding having $N_1$ turns;
said second winding having $N_2$ turns;
the ratio of turns $N_1/N_2$ is said preselected value.

24. The invention according to claim 23 further comprising:

said first and second transistors for conducting current during a first half cycle; and
said third and fourth transistors for conducting current during a second half cycle.

25. The invention according to claim 24 further comprising:
said first and third transistors for conducting a first instantaneous current at the end of said first and third periods of time, respectively;
said second and fourth transistors for conducting a second instantaneous current at the beginning of said second and fourth periods of time respectively; and
said second predetermined amount of current being $$\frac{N_1}{N_1+N_2}$$

of said first predetermined amount of current.

26. A high efficiency DC to DC converter, comprising:
input means for receiving DC power;
an inductor coupled to said input means having a first winding with $N_1$ turns and a second winding having $N_2$ turns, said first winding for conducting a first current, said first and second windings for conducting a second current;
a transformer having a plurality of primary windings, a first winding having $N_3$ turns for providing a first current path, a second winding having $N_4$ turns for providing a second current path, a third winding having $N_5$ turns for providing a third current path, and a fourth winding having $N_6$ turns for providing a fourth current path, said transformer having a secondary winding, said windings having a turns ratio of $N_3:N_4=N_5:N_6=N_1:N_2$;
first magnetic amplifier coupled between said first inductor winding and said first current path for providing a first current during a period of a first half cycle of a first square wave generator;
a first switching circuit coupled to said second inductor winding and said second current path for controlling a second current during a period of a first half cycle, said second current being $$\frac{N_1}{N_1+N_2}$$

of said first current;
a second magnetic amplifier coupled between said first inductor winding and said third current path for providing a first current during a period of a second half cycle;
a second switching circuit coupled to said second inductor winding and said fourth current path for controlling a second current during a period of a second half cycle, said second current being $$\frac{N_1}{N_1+N_2}$$

of said first current;
control means coupled to said first and second magnetic amplifiers and said first and second square wave generators for controlling said first and second currents in said current paths;

rectifier means coupled to said secondary winding; and output means coupled to said rectifier means.

* * * * *